US012572061B2

(12) United States Patent
Chien et al.

(10) Patent No.: US 12,572,061 B2
(45) Date of Patent: Mar. 10, 2026

(54) PROJECTION DEVICE

(71) Applicant: Coretronic Corporation, Hsin-Chu (TW)

(72) Inventors: Wei-Min Chien, Hsin-Chu (TW); Tung-Chou Hu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 267 days.

(21) Appl. No.: 18/491,819

(22) Filed: Oct. 23, 2023

(65) Prior Publication Data

US 2024/0134258 A1    Apr. 25, 2024
US 2024/0231205 A9    Jul. 11, 2024

(30) Foreign Application Priority Data

Oct. 24, 2022    (CN) .......................... 202211300620.8

(51) Int. Cl.
G03B 21/16        (2006.01)
G03B 21/14        (2006.01)
(52) U.S. Cl.
CPC ........... G03B 21/16 (2013.01); G03B 21/145 (2013.01)
(58) Field of Classification Search
CPC .. G03B 21/16; G03B 21/145; G03B 21/2013; G03B 21/2033
USPC .......................................................... 353/57
See application file for complete search history.

(56) References Cited

U.S. PATENT DOCUMENTS 6,379,012 B1    4/2002  Enochs et al.
2003/0202160 A1  10/2003  Chimura et al.

2006/0072080 A1    4/2006  Perkins et al.
2006/0290897 A1   12/2006  Engle et al.
2008/0123062 A1    5/2008  Morikuni et al.
2008/0198338 A1    8/2008  Yokote et al.
2011/0188004 A1    8/2011  Maeda et al.
2011/0188008 A1    8/2011  Maeda et al.
2013/0010268 A1    1/2013  Nishima et al.
2020/0041883 A1*   2/2020  Chung ................. G03B 21/208
(Continued)

FOREIGN PATENT DOCUMENTS

CN          106961813          7/2017
CN          209821580         12/2019
(Continued)

OTHER PUBLICATIONS

"Office Action of U.S. Appl. No. 18/492,799", issued on Dec. 12, 2025, p. 1-p. 9.

*Primary Examiner* — Toan Ton
(74) *Attorney, Agent, or Firm* — JCIPRNET

(57) ABSTRACT

A projection device of the present invention includes a casing, a light source module, a light source thermal module, a fan, and a projection lens; wherein the light source module, the light source thermal module, the fan and the projection lens are disposed in the casing, and the casing has a first side wall, a second side wall, and a bottom plate, wherein the first side wall includes a first air inlet, and the second side wall includes an air outlet; the orthographic projection range of the air outlet on the first side wall overlaps with the orthographic projection range of the light source thermal module on the first side wall, and the orthographic projection range of the projection lens on the first side wall does not overlap with the orthographic projection range of the light source thermal module on the first side wall.

19 Claims, 13 Drawing Sheets

(56) References Cited

U.S. PATENT DOCUMENTS

| | | | | |
|---|---|---|---|---|
| 2020/0041884 | A1* | 2/2020 | Chung | .................. G03B 21/16 |
| 2022/0413371 | A1* | 12/2022 | Hou | ...................... G03B 21/16 |
| 2023/0236486 | A1* | 7/2023 | Tsai | ..................... G03B 21/145 |
| | | | | 353/57 |
| 2024/0111207 | A1* | 4/2024 | Hou | ..................... G03B 21/145 |
| 2024/0134256 | A1 | 4/2024 | Chien et al. | |
| 2024/0142864 | A1* | 5/2024 | Huang | .................. G03B 21/16 |

FOREIGN PATENT DOCUMENTS

| | | |
|---|---|---|
| CN | 211698565 | 10/2020 |
| TW | 1337295 | 2/2011 |
| TW | I440955 | 6/2014 |
| TW | M486786 | 9/2014 |

* cited by examiner

2111(2121)          2113          2112          312          31

2113          31

PROJECTION DEVICE

CROSS-REFERENCE TO RELATED APPLICATION

This application claims the priority benefit of China application serial no. 202211300620.8, filed on Oct. 24, 2022. The entirety of the above-mentioned patent application is hereby incorporated by reference herein and made a part of this specification.

BACKGROUND

Technical Field

The present invention relates to a projection device.

Description of Related Art

FIG. 1 is a schematic view of a conventional known projector. Referring to FIG. 1, a projector 1 is a small-sized display device capable of projecting a large-sized image, and this also means that the projector 1 is a high energy-consuming electronic product and accommodates necessary electronic elements and optical elements within a casing 11. Therefore, in order to solve the high thermal energy generated by the electronic elements and optical elements of the projector 1 during projection, the conventional known projector 1 uses active cooling designs such as fans for dissipating heat generated by the electronic elements and/or optical elements within the casing 11, and holes are also disposed on the casing 11 of the projector 1 as air inlet and air outlet. The projector 1 is capable to achieve a better heat dissipation effect through the arrangement of the air inlet and air outlet 12 on the casing 11. However, the external dust would also get into the casing 11 through the air inlet and air outlet 12, so as to accumulate in the system of the projector 1. Especially when dust accumulates on the optical member 13 (such as a reflector) of the projection lens, it has a considerable impact on the image quality and brightness of the projector 1. On the contrary, if the heat dissipation design is omitted from the arrangement of the projector and the dust-proof design is used in the projector, the projection lens is likely to be deformed due to heat accumulation, which affects the quality of the projected image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The present invention provides a projection device, which uses a slidable cover to cover the air inlet and air outlet to reduce dust accumulation inside the projection device, and the heat dissipation function of the projection device may be improved through the air inlet and outlet and the configuration of internal elements.

The other objectives and advantages of the present invention may be further understood from the descriptive features disclosed in the present invention.

To achieve one, a portion, or all of the above purposes or other purposes, a projection device of the present invention includes a casing, a light source module, a light source thermal module, a fan, and a projection lens. The light source module, the light source thermal module, the fan, and the projection lens are disposed in the casing, and the casing has a first side wall, a second side wall, and a bottom plate. The first side wall is opposite to the second side wall, the bottom plate is respectively connected to the first side wall and the second side wall, the first side wall provides with a first air inlet, and the second side wall provides with an air outlet. The light source thermal module is connected to the light source module and disposed adjacent to the second side wall, and the light source thermal module is located between the projection lens and the bottom plate. The fan is disposed between the first side wall and the light source thermal module. Orthographic projection range of the air outlet onto the first side wall overlaps with orthographic projection range of the light source thermal module onto the first side wall, and the orthographic projection range of the projection lens onto the first side wall does not overlap with orthographic projection range of the light source thermal module onto the first side wall.

Based on the above, the projection device of the present invention improves the overall heat dissipation effect by restructuring the composition of the elements therein.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
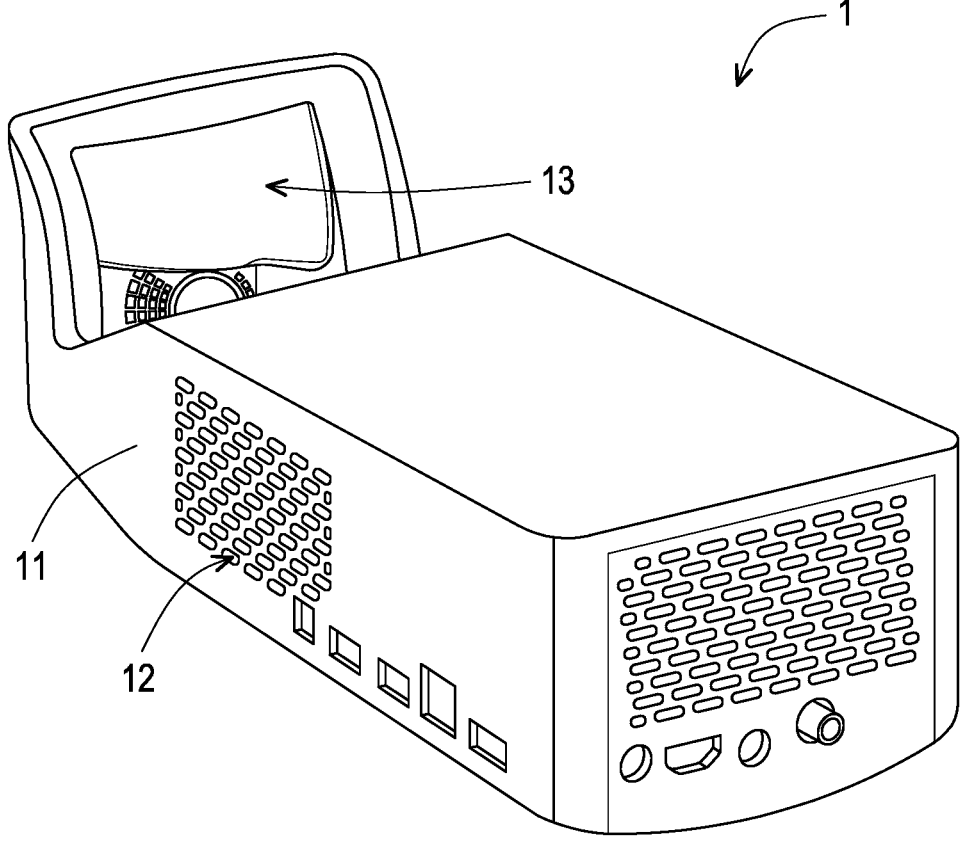
FIG. 1 is a schematic view of a conventional known projector.
Figure 2:
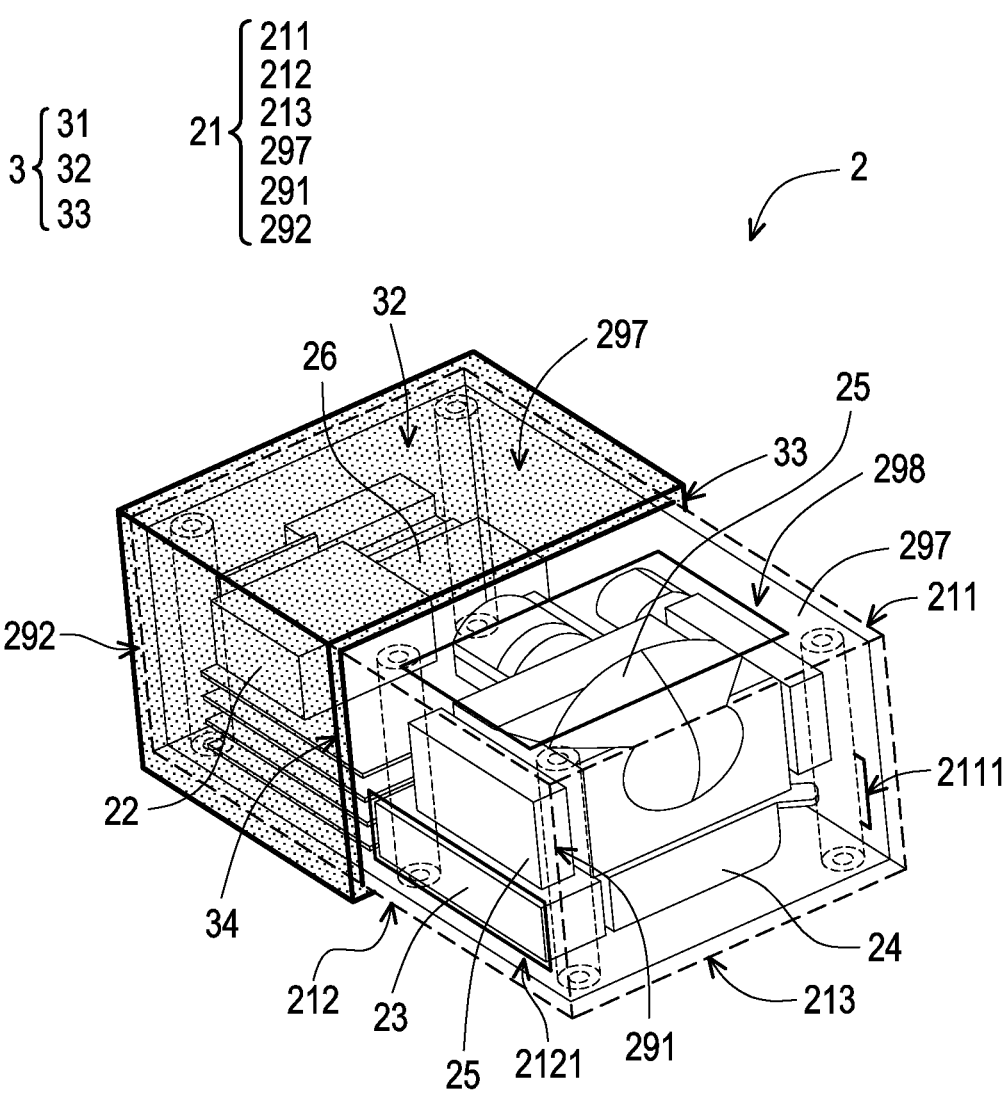
FIG. 2 is a three-dimensional schematic view of the projection device of the present invention.
Figure 3:
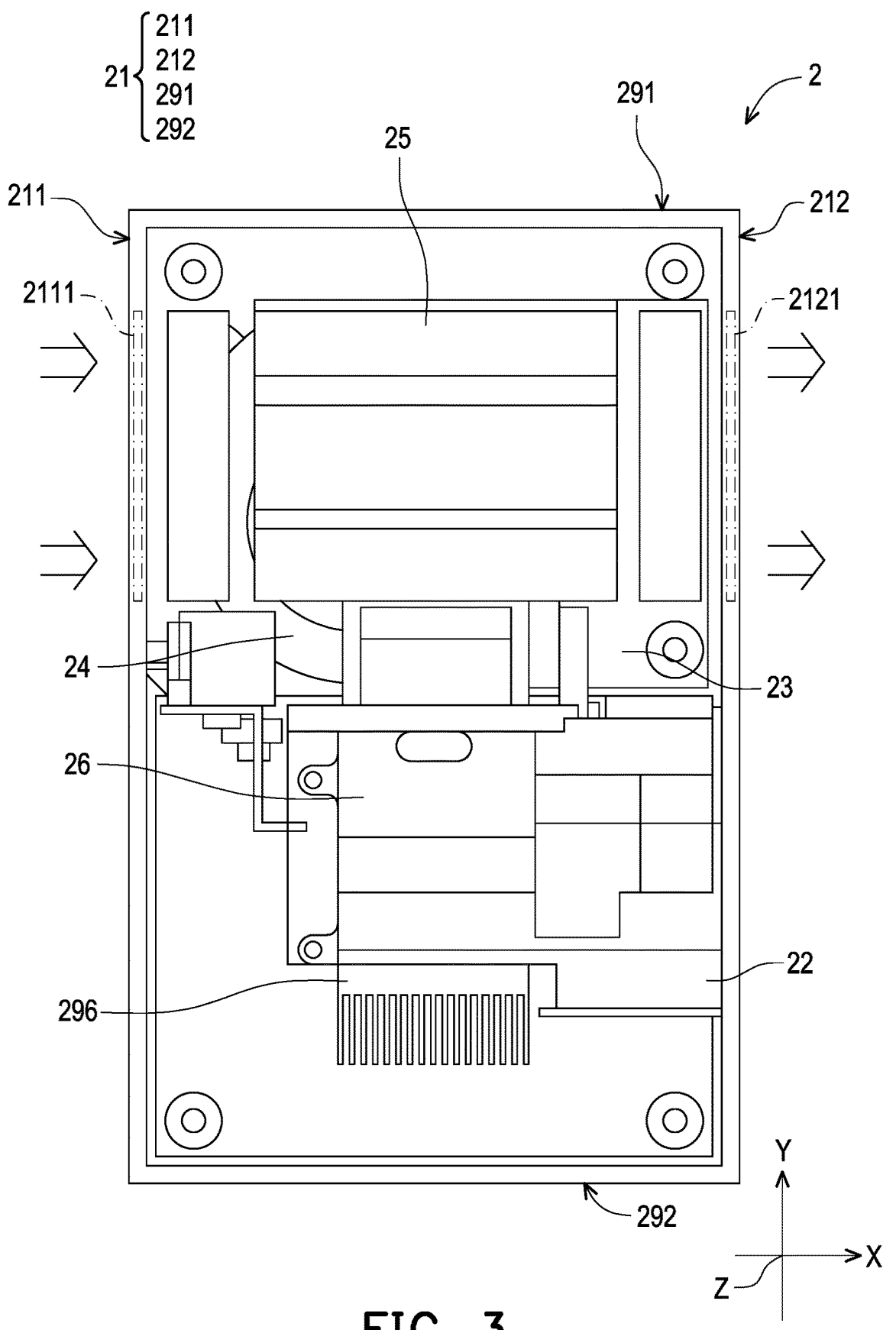
FIG. 3 is a top view of the projection device of FIG. 2.

FIG. 2 is a three-dimensional schematic view of the projection device of the present invention. FIG. 3 is a top view of the projection device of FIG. 2, and FIG. 4 is a side view at a viewing angle of the projection device of FIG. 3, in which the sildable cover in FIG. 2 is omitted in FIG. 3 and FIG. 4.

Figure 4:
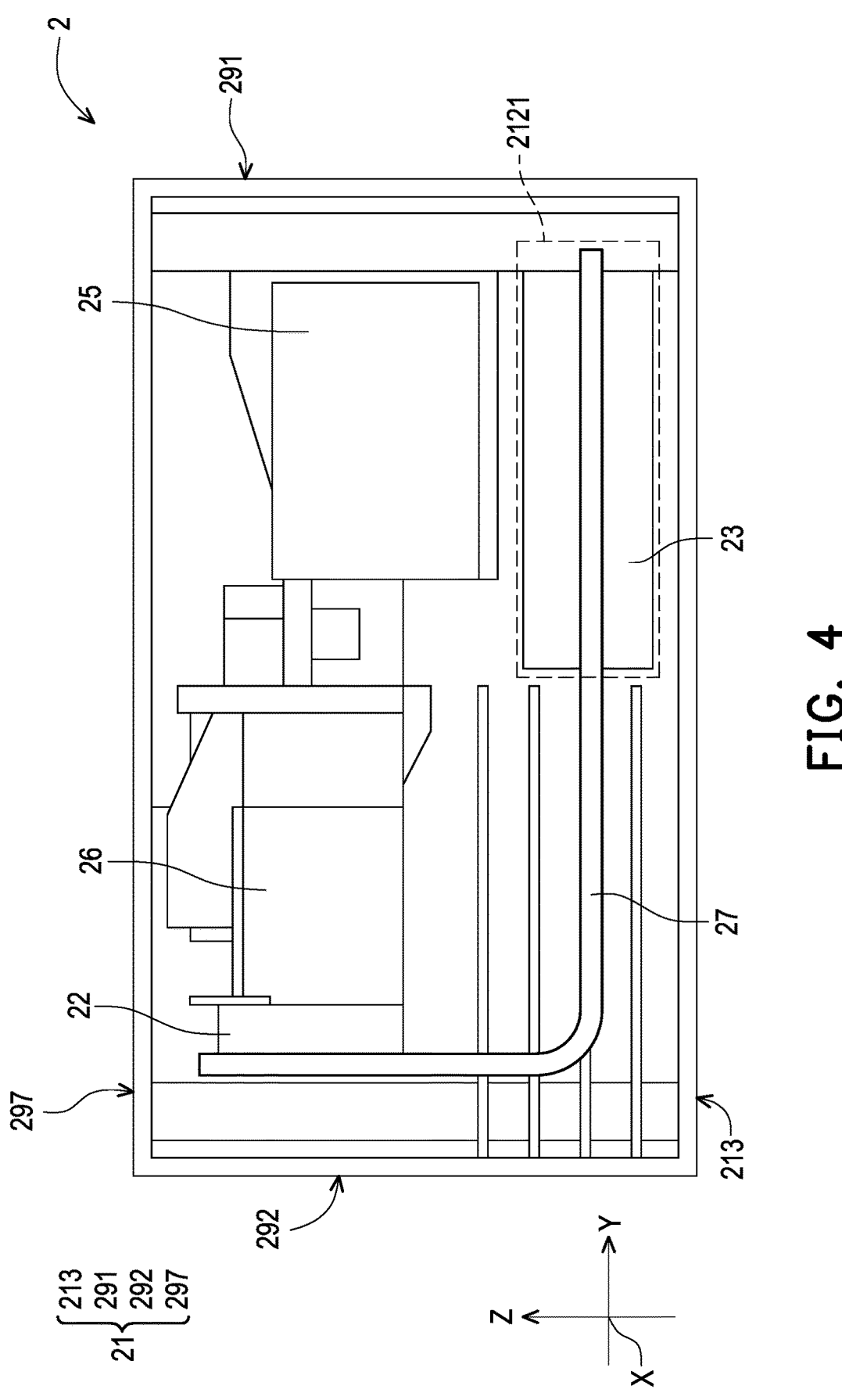
FIG. 4 is a side view at a viewing angle of the projection device of FIG. 3.

Referring to FIG. 2, FIG. 3, and FIG. 4 at the same time, a projection device 2 of this embodiment includes a casing 21, a light source module 22, a light source thermal module 23, a fan 24, an imaging module 26, and a projection lens 25. The light source module 22, the light source thermal module 23, the fan 24, the imaging module 26, and at least a portion of the projection lens 25 are all disposed in the casing 21.

The casing 21 has a first side wall 211, a second side wall 212, and a bottom plate 213. The first side wall 211 is opposite to the second side wall 212, and the bottom plate 213 is respectively connected to the first side wall 211 and the second side wall 212. The first side wall 211 includes a first air inlet 2111, and the second side wall 212 includes an air outlet 2121. The light source module 22, the light source thermal module 23, the fan 24, the imaging module 26, and at least a portion of the projection lens 25 are all located between the first side wall 211 and the second side wall 212 of the casing 21. The light source thermal module 23 is connected to the light source module 22 and disposed adjacent to the second side wall 212 for dissipating the heat generated by the light source module 22, and the light source thermal module 23 is located between the projection lens 25 and the bottom plate 213 of the casing 21. The fan 24 is disposed between the first side wall 211 and the light source thermal module 23, and the fan 24 is located between the bottom plate 213 of the casing 21 and the projection lens 25.

An orthographic projection range of the air outlet 2121 onto the second side wall 212 onto the first side wall 211 and an orthographic projection range of the light source thermal module 23 onto the first side wall 211 overlap with the first air inlet 2111 of the first side wall 211. An orthographic projection range of the projection lens 25 onto the first side wall 211 does not overlap with the orthographic projection range of the light source thermal module 23 onto the first side wall 211. To further illustrate, the orthographic projection range of the projection lens 25 onto the first side wall 211 does not overlap with the orthographic projection range of the light source thermal module 23 onto the first side wall 211 at all.

The orthographic projection range of the imaging module 26 of the projection device 2 onto the first side wall 211 does not overlap with the orthographic projection range of the light source thermal module 23 onto the first side wall 211.

In the Z-axis direction, the inside space of the casing 21 may be roughly divided into an upper space and a lower space, in which the light source module 22, the imaging module 26, and the projection lens 25 are located in the upper space of the casing 21, while the light source thermal module 23, and the fan 24 are located in the lower space of the casing 21. The light source module 22 is connected to the light source thermal module 23 through at least one heat pipe 27, that is, one end of each of the at least one heat pipe 27 is connected to the light source module 22 and the other end of each of the at least one heat pipe 27 is connected to the light source thermal module 23, so that the heat generated by the light source module 22 is transferred to the light source thermal module 23 through the at least one heat pipe 27.

It may be seen from the above that the first air inlet 2111 and the air outlet 2121 are located on opposite sides of the projection lens 25. The projection lens 25 is located between the first air inlet 2111 and the air outlet 2121. The first air inlet 2111 and the air outlet 2121 correspond to the lower space of the casing 21. The orthographic projection range of the air outlet 2121 onto the first side wall 211 at least partially overlaps with the first air inlet 2111 of the first side wall 211. The orthographic projection range of the light source thermal module 23 onto the first side wall 211 partially overlaps with or completely overlaps with the orthographic projection range of the air outlet 2121 onto the first side wall 211. The orthographic projection range of the light source thermal module 23 onto the first side wall 211 partially overlaps with or completely overlaps with the first air inlet 2111 of the first side wall 211. Therefore, the airflow entering the casing 21 through the first air inlet 2111 may pass around the projection lens 25 and take away the heat generated by the projection lens 25 when the projection device 2 is in operation, so that the projection lens 25 may have a good heat dissipating effect.

In addition, the aforementioned orthographic projection range of the light source thermal module 23 onto the first side wall 211 does not overlap with the orthographic projection range of the light source module 22 onto the first side wall 211. Specifically, in the Z-axis direction, the height of the light source module 22 and the projection lens 25 relative to the bottom plate 213 is higher than the height of the light source thermal module 23 relative to the bottom plate 213. The light source module 22 and the projection lens 25 are arranged along the Y axis, and the light source module 22 is not located on the side of the projection lens 25 along the X-axis direction.

Based on the above, the light source module 22 is connected to the light source thermal module 23 through the at least one heat pipe 27, and the heat generated by the light source module 22 is transferred to the light source thermal module 23, and since the light source thermal module 23 is located between the first air inlet 2111 and the air outlet 2121 and is disposed adjacent to the air outlet 2121. When the air outside the projection device 2 enters the inside space of the casing 21 through the first air inlet 2111, the heat received by the light source thermal module 23 may be dissipated to the outside through the air outlet 2121.

As may be seen from the above, the projection device 2 of the present invention provides a novel component configuration structure, by disposing the main thermal mechanism in the lower space of the casing 21, disposing the rest of the components in the upper space of the casing 21, overlapping the orthographic projection range of the air outlet 2121 onto the first side wall 211 with the first air inlet 2111, so that after the airflow enters the inside space of the casing 21 through the first air inlet 2111, there are fewer components to interfere with the airflow in the space between the first air inlet 2111 and the air outlet 2121 and that most of the airflow passes through the light source thermal module 23 and is directly dissipated from the air outlet 2121. The cooling airflow may flow quickly to take away the heat generated by the light source module 22 and/or the projection lens 25 inside the casing 21, and may efficiently dissipate heat from the light source thermal module 23, thereby providing a good heat dissipation effect.

Figure 5:
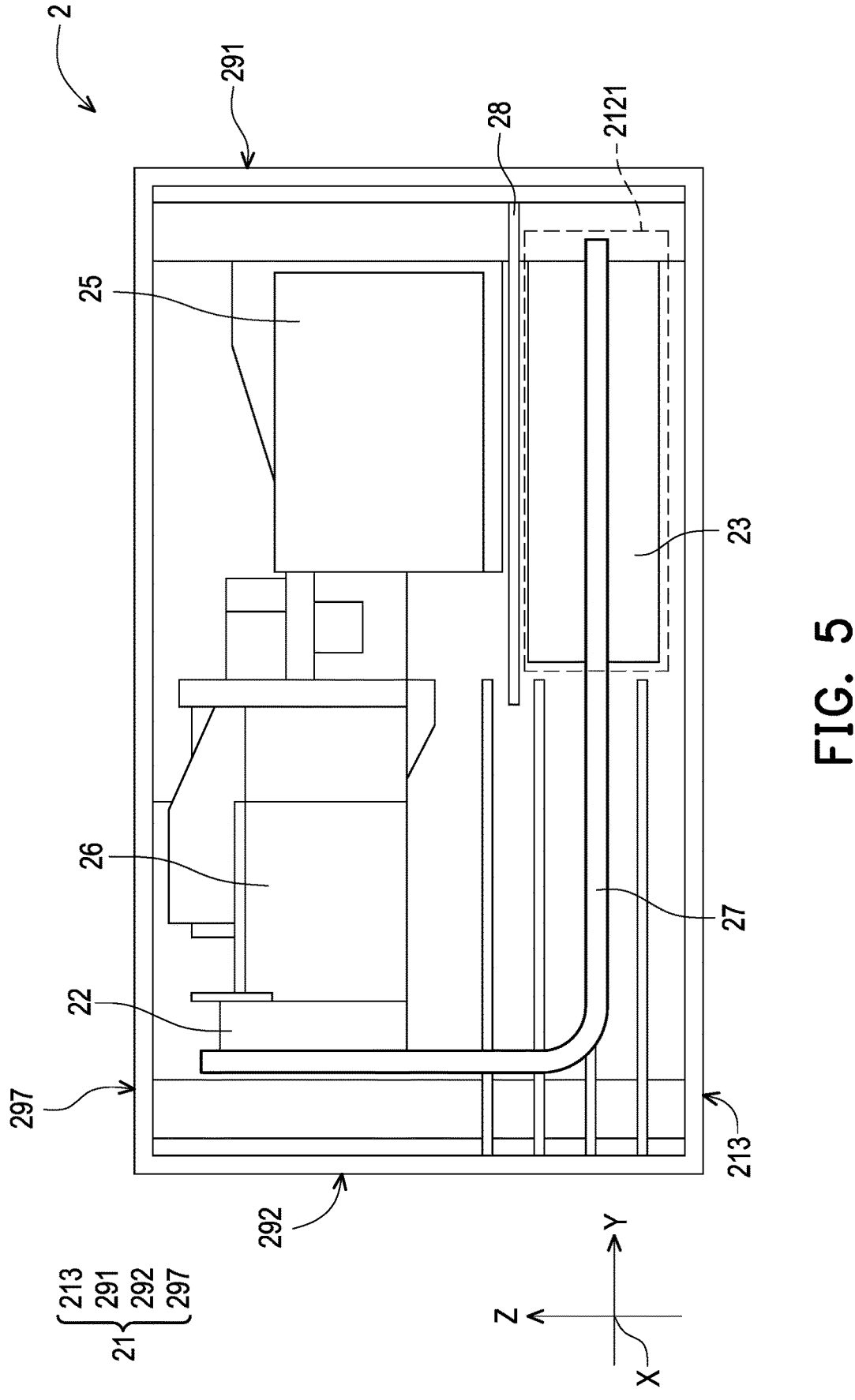
FIG. 5 is a schematic view of disposing a heat shield plate in the projection device.

FIG. 5 is a schematic view of disposing a heat shield plate in the projection device. Referring to FIG. 5, the projection device 2 further includes a heat shield plate 28 disposed between the light source thermal module 23 and the projection lens 25. The orthographic projection range of the heat shield plate 28 onto the bottom plate 213 completely overlaps with the orthographic projection range of the light source thermal module 23 onto the bottom plate 213. The heat shield 28 plate is used to prevent the heat generated by the light source thermal module 23 from being transferred to the projection lens 25. Specifically, in order to prevent heat from being transferred from the light source thermal module 23 to the projection lens 25 by conduction, there are gaps between the heat shield plate 28 and the light source thermal module 23, and between the heat shield plate 28 and the projection lens 25. In addition, in order to further prevent heat from being transferred from the light source thermal module 23 to the projection lens 25 by radiation, the gaps between the heat shield plate 28 and the light source thermal module 23 and between the heat shield 28 the projection lens 25 are greater than or equal to 1 millimeter (mm), in which the thermal conductivity of the material of the heat shield plate 28 is less than or equal to 1 W/mK. In addition, after entering the inside space of the casing 21 through the first air inlet 2111, the airflow may flow through the gap between the heat shield plate 28 and the light source thermal module 23 and the gap between the heat shield plate 28 and the projection lens 25, so as to respectively dissipate heat from the projection lens 25 and the light source thermal module 23.

Figure 6:
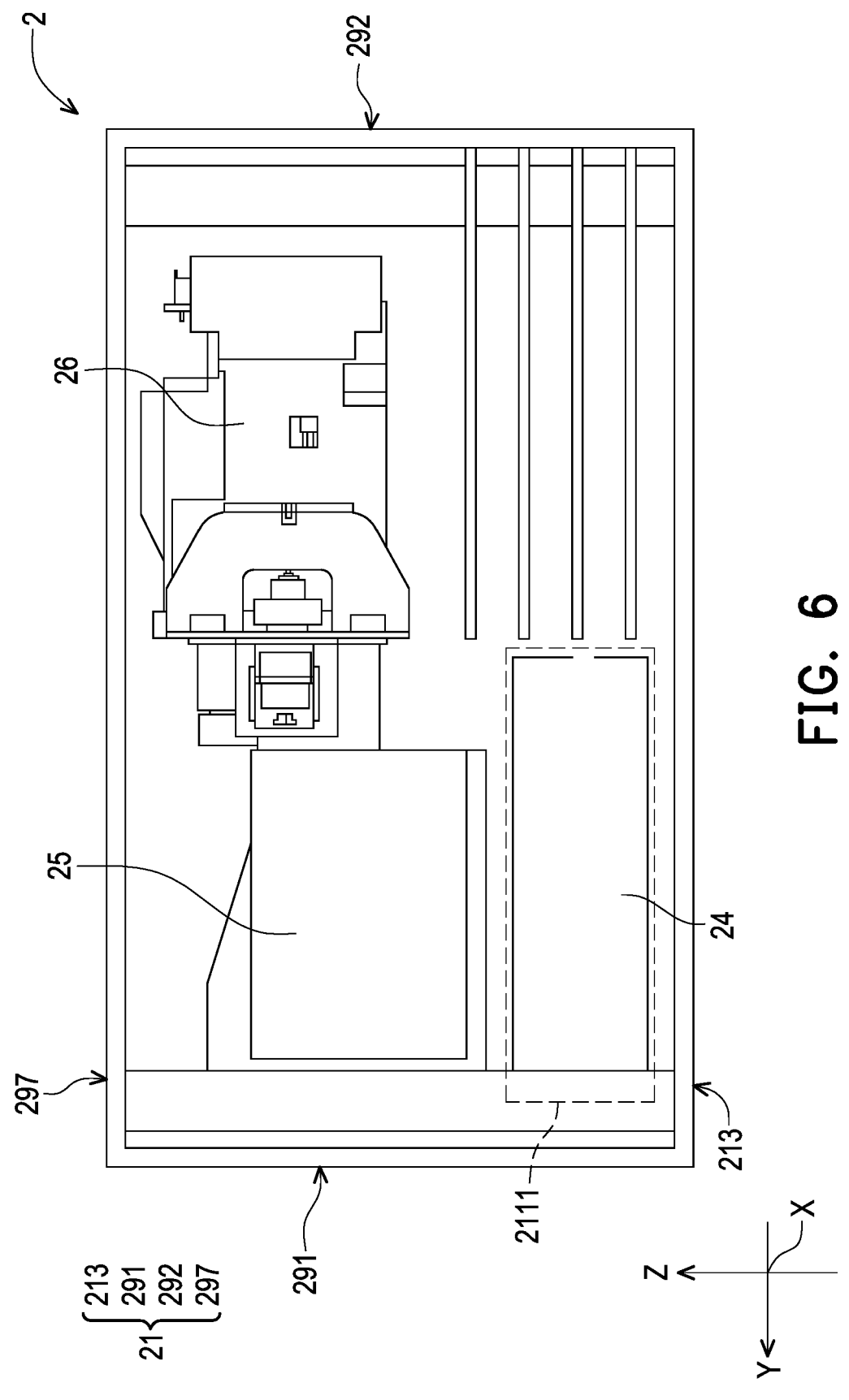
FIG. 6 is a side view at another viewing angle of the projection device of FIG. 3.
Figure 7:
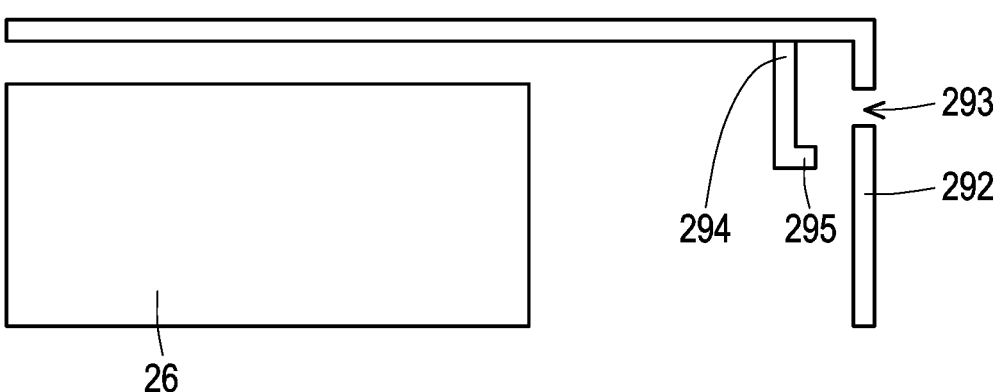
FIG. 7 is a schematic view of a dust-proof baffle included in the casing.
Figure 8:
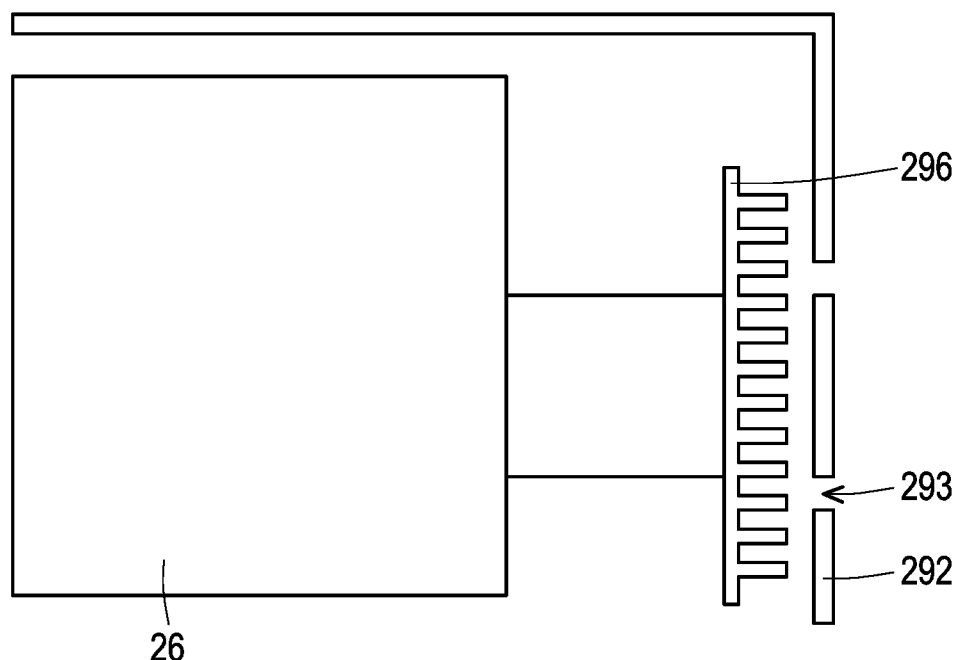
FIG. 8 is a schematic view of the projection device replacing the dust-proof baffle in FIG. 7 by a heat dissipation fin set.

FIG. 6 is a side view at another viewing angle of the projection device of FIG. 3. Referring to FIG. 2, FIG. 3, FIG. 4, and FIG. 6 at the same time, the casing 21 includes a front cover 291 and a rear cover 292. The front cover 291 is opposite to the rear cover 292. The second side wall 212 and the bottom plate 213 are respectively connected to the front cover 291 and the rear cover 292. The projection lens 25 is located between the front cover 291 and the rear cover 292, and the projection lens 25 is disposed adjacent to the front cover 291. The rear cover 292 may also include a second air inlet 293 (as shown in FIG. 7 and FIG. 8). The second air inlet 293 is disposed relatively away from the projection lens 25 and is used to assist in providing another air inlet different from the first air inlet 2111. In the Y axis, a distance between the projection lens and the front cover 291 is smaller than a distance between the projection lens 25 and the second cover 292. In addition, the fan 24 is correspondingly disposed next to the first air inlet 2111. Driven by the fan 24, the cooling airflow enters the inside space of the casing 21 from the first air inlet 2111, and dissipates directly from the air outlet 2121 after passing through the light source thermal module 23. The cooling airflow may flow quickly to take away the heat generated by the light source module 22 and/or the projection lens 25 inside the casing 21.

In addition, the input/output connection ports (not shown) may also be disposed on the rear cover 292, so that additional holes may be avoided on the first side wall 211 and the second side wall 212 of the casing 21, which affects the consistency of the appearance. The number of holes may also be reduced to prevent dust from entering the casing 21 through the holes disposed on the side wall.

FIG. 7 is a schematic view of a dust-proof baffle included in the casing, in which FIG. 7 only shows a portion of the casing 21. Referring to FIG. 7, in order to further prevent dust from entering, the projection device 2 may further include a dust-proof baffle 294 disposed inside the casing 21. The dust-proof baffle 294 corresponds to the second air inlet 293 and is disposed adjacent to the rear cover 292. The dust-proof baffle 294 and the casing 21 may be integrally formed, or the dust-proof baffle 294 may be an independent plate connected to the inside periphery of the casing 21. The disposition of the dust-proof baffle 294 may be selected according to requirements.

Moreover, the dust-proof baffle 294 includes a bent portion 295 extending toward the rear cover 292. The dust-proof baffle 294 may effectively block the dust entering from the second air inlet 293, and the orthographic projection of the bent portion 295 onto the rear cover 292 is closer to the bottom plate 213 relative to the second air inlet 293, and dust entering the casing 21 from the second air inlet 293 falls and accumulates in the bent portion 295.

The dust-proof baffle 294 may be designed to visually cover the second air inlet 293 as viewing from the outside of the projection device, so as to prevent the internal components of the casing 21 from being peeped.

FIG. 8 is a schematic view of the projection device replacing the dust-proof baffle in FIG. 7 by a heat dissipation fin set, in which FIG. 8 only shows a portion of the casing. In the embodiment as shown in FIG. 8, the projection device 2 includes a heat dissipation fin set 296 disposed in the casing 21 to replace the aforementioned design of the dust-proof baffle 294. Specifically, the heat dissipation fin set 296 is disposed in the casing 21 and adjacent to the rear cover 292, in which the heat dissipation fin set 296 corresponds to the second air inlet 293 and the surface portion of the heat dissipation fin set 296 facing towards the second air inlet 293 may be coated with black paint, so as to visually cover the second air inlet 293 as viewing from the outside of the projection device, thereby preventing the internal components of the casing 21 from being peeped. Compared with the aforementioned embodiment in FIG. 7, the heat dissipation fin set 296 may be one of the elements of the original thermal mechanism in the projection device 2, so there is no need to additionally dispose the dust-proof baffle 294, which reduces the number of internal components disposed inside the casing 21 and creates more space. In this embodiment, the heat dissipation fin set 296 is, for example, a thermal element connected with a light valve (e.g., a DMD) in the imaging module 26, and the heat generated by the light valve is transferred to the heat dissipation fin set 296 for heat dissipation.

Figure 9:
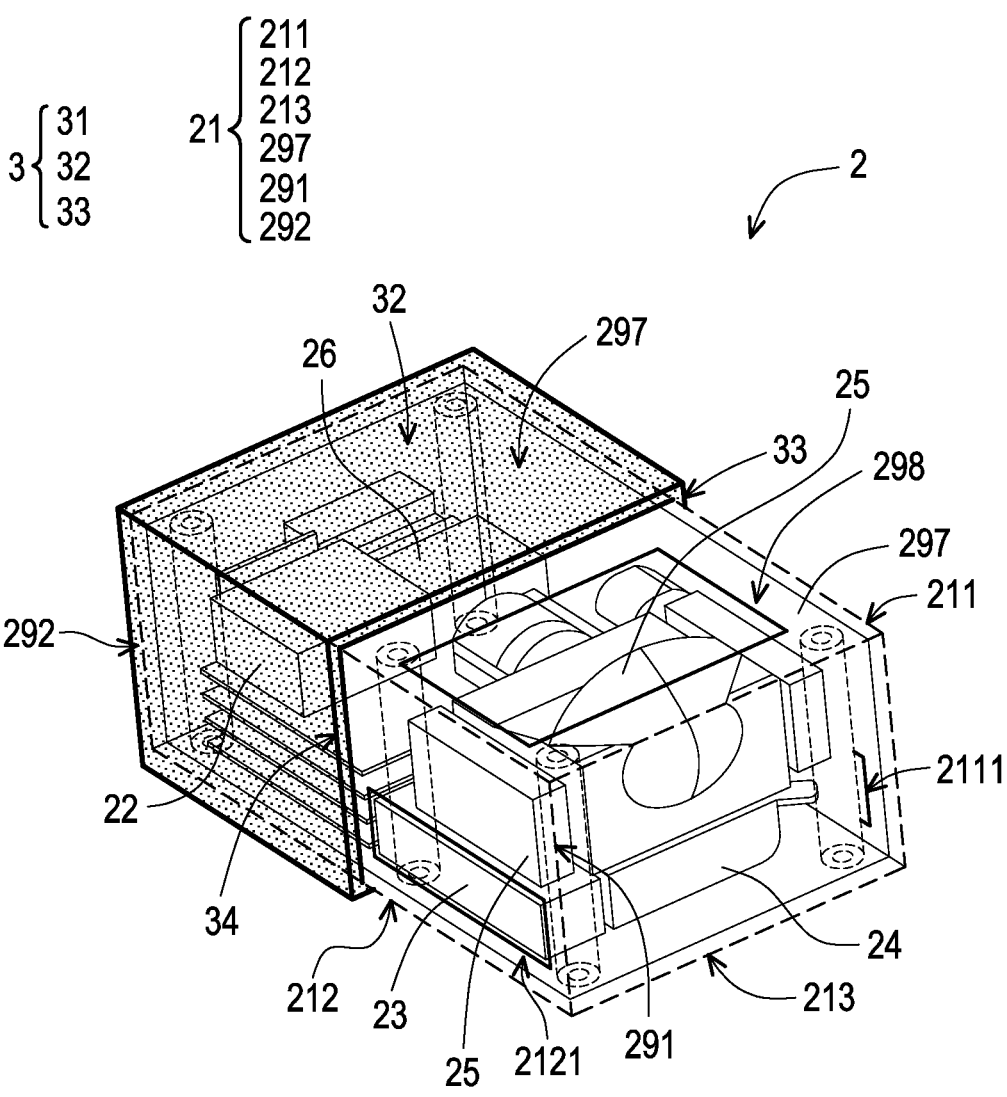
FIG. 9 is a schematic view of a sildable cover of the projection device in an opened state.
Figure 10:
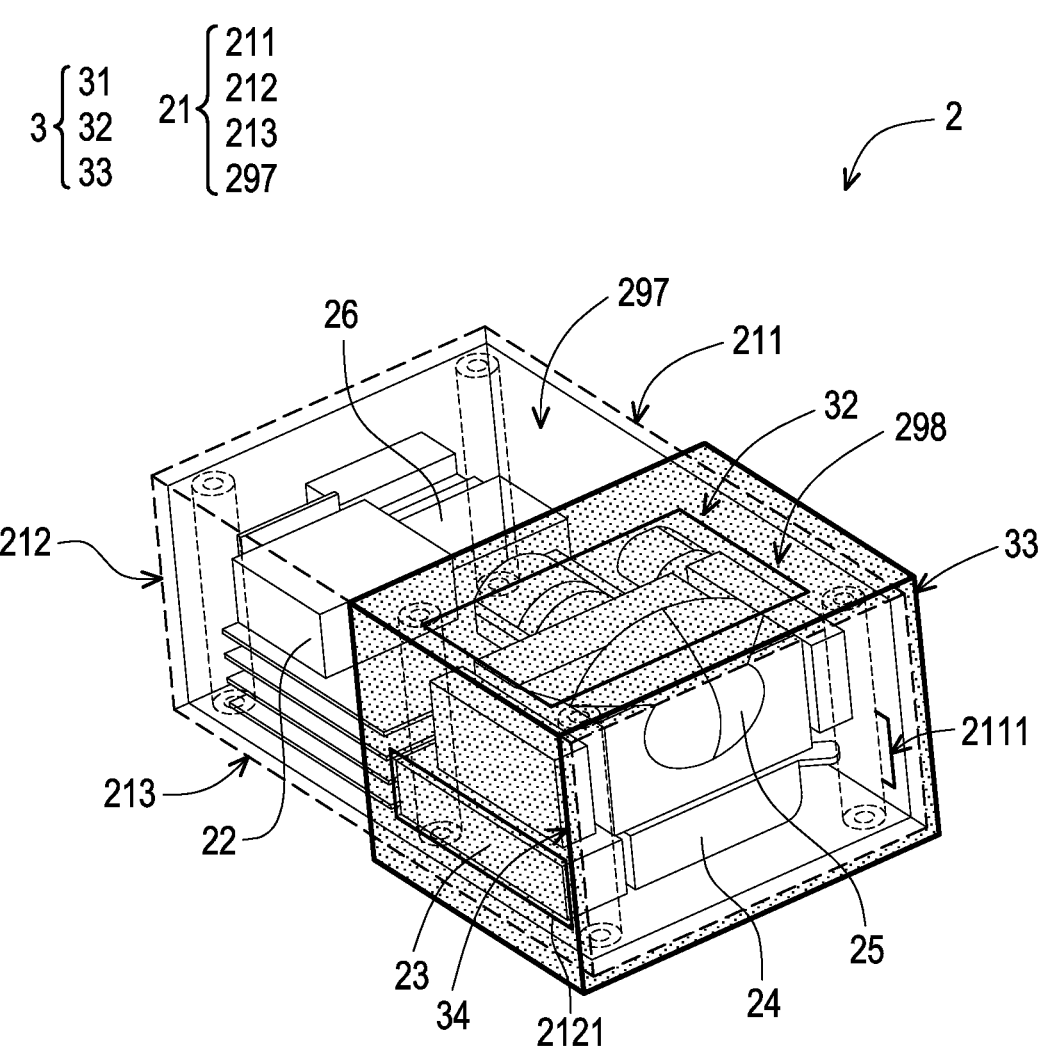
FIG. 10 is a schematic view of a sildable cover of the projection device in a closed state.

FIG. 9 is a schematic view of a sildable cover of the projection device in an opened state, and FIG. 10 is a schematic view of a sildable cover of the projection device in a closed state. Referring to FIG. 9 and FIG. 10, the casing 21 also includes a top cover 297. The top cover 297 is connected to the first side wall 211 and the second side wall 212. In detail, the top cover 297, the bottom plate 213, the first side wall 211, the second side wall 212, the front cover 291, and the rear cover 292 of the casing 21 define a space, which is the internal space of the casing 21 mentioned above, and the light source module 22, the light source thermal module 23, the fan 24, the imaging module 26, and at least a portion of the projection lens 25 are all disposed in the space (i.e., in the casing 21). The top cover 297 includes an opening 298, and the opening 298 exposes a portion of the projection lens 25. Specifically, the opening 298 exposes a reflective element (not shown) of the projection lens 25. The reflective element is, for example, a concave mirror for reflecting the image beam generated by the projection device 2 out of the projection device 2 and projecting the image beam onto a projection surface (not shown). In another embodiment, the top cover 297 is configured with a transparent glass or a transparent plate at a position corresponding to the opening 298 to allow the image beam to penetrate and prevent dust from falling through the opening 298.

In this embodiment, in order to prevent dust from accumulating on the projection lens 25, the projection device 2 further includes a sildable cover 3 disposed on the casing 21. The sildable cover 3 is configured to slide relative to the casing 21 to be in an opened state or a closed state. As shown in FIG. 9, when the sildable cover 3 is in the opened state, the opening 298 of the top cover 297 and the first air inlet 2111 and the air outlet 2121 are exposed, and thus the projection device 2 may project an image beam and simultaneously dissipate heat. As shown in FIG. 10, when the sildable cover 3 is in the closed state, the sildable cover 3 covers the opening 298 of the top cover 297 and covers the first air inlet 2111 and the air outlet 2121. In this way, the effects of preventing dust from accumulating on the projection lens 25 and preventing dust from entering the projection device from the air inlet and outlet may be achieved. In this embodiment, the sildable cover 3 is located outside the casing 21, and the sildable cover 3 may be a U-shaped piece that may move relative to the top cover 297, the first side wall 211, and the second side wall 212 of the casing 21. In other embodiments, the sildable cover 3 is located outside the casing 21 and is a flat plate, which may move relative to the top cover 297 of the casing 21. In another embodiment, the sildable cover 3 may be located inside the casing 21 and may be moved to a closed state that shields the opening 298 or stored in the casing 21 to expose the opening 298 to an opened state. In another embodiment, the position corresponding to the opening 298 of the top cover 297 may be configured with a transparent glass or a transparent plate to allow the image beam to penetrate and prevent dust from falling in through the opening 298. A size of the transparent glass or the transparent plate is configured to be the same as the opening 298 of the top cover 297 for entirely covering the opening 298. The sildable cover 3 may move relative to the casing 21 to cover the transparent glass or the transparent plate, or expose the transparent glass or the transparent plate.

Figure 11A:
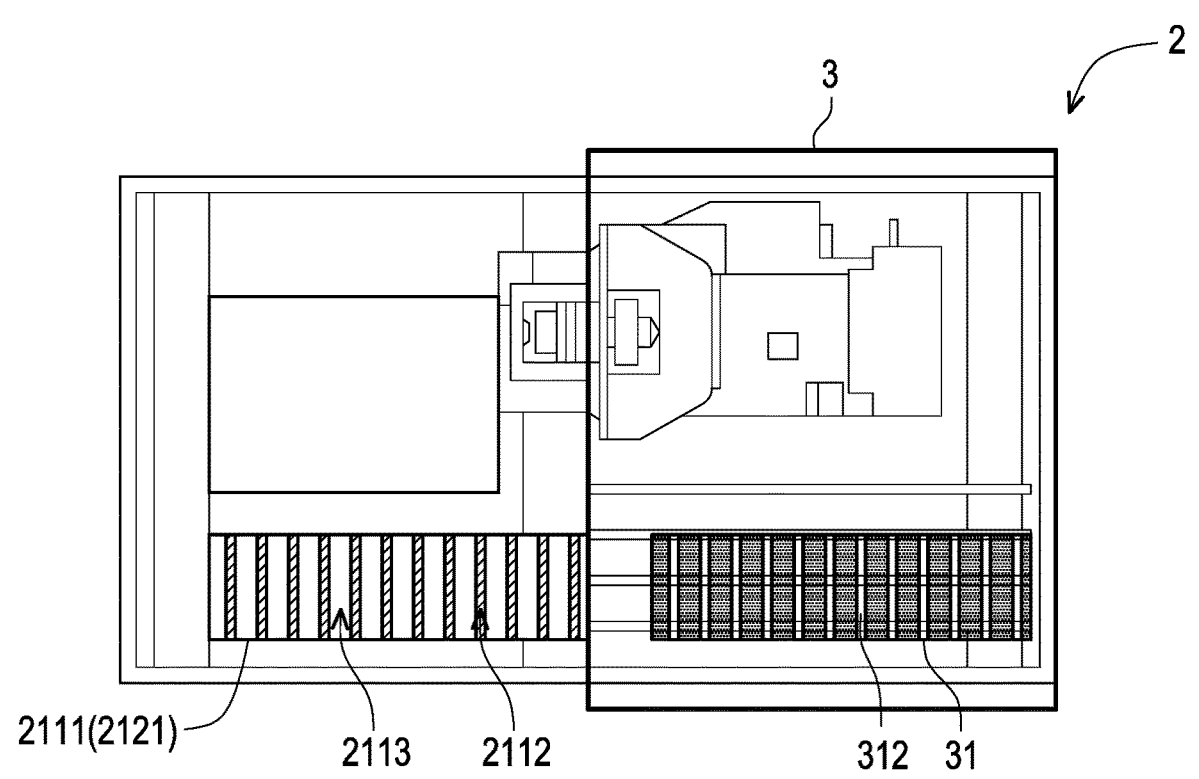
FIG. 11A and FIG. 11B are schematic views of the sildable cover and the casing including a fence structure.
Figure 11B:
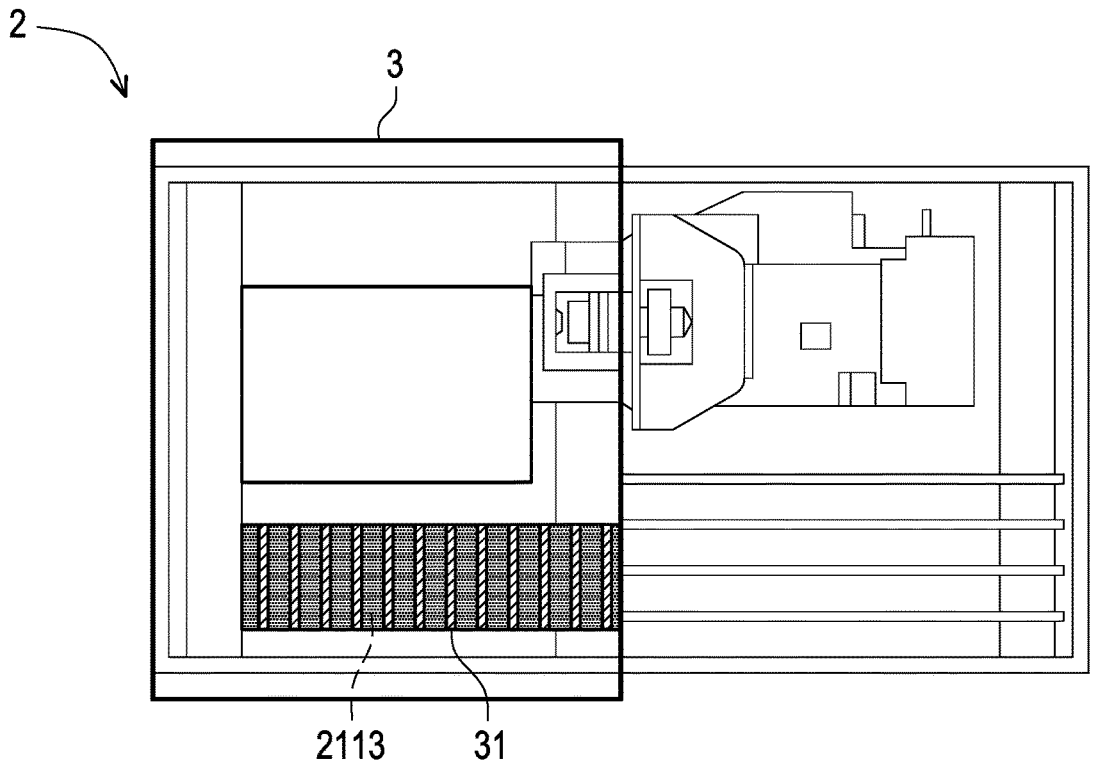

Based on the above, in the embodiment shown in FIG. 11A and FIG. 11B, when the sildable cover 3 is a U-shaped piece, sildable cover 3 disposes fence openings 31 respectively corresponding to the first air inlet 2111 and the air outlet 2121, and when the sildable cover 3 is in a closed state, the positions of the two fence openings 31 of the sildable cover 3 respectively correspond to the positions of the first air inlet 2111 and the air outlet 2121 of the casing 21.

Referring to FIG. 2, FIG. 11A, and FIG. 11B, specifically, the sildable cover 3 has a cover top wall 32, a first cover side wall 33, and a second cover side wall 34. The first cover side wall 33 is opposite to the second cover side wall 34. The cover top wall 32 is connected between the first cover side wall 33 and the second cover side wall 34, that is, the cover top wall 32, the first cover side wall 33, and the second cover side wall 34 form a U-shaped piece. The cover top wall 32 corresponds to the top cover 297 of the casing 21, the first cover sidewall 33 corresponds to the first sidewall 211 of the casing 21, and the second cover sidewall 34 corresponds to the second sidewall 212 of the casing 21. The two fence openings 31 of the sildable cover 3 are respectively disposed on the first cover side wall 33 and the second cover side wall 34.

The first side wall 211 of the casing 21 has multiple baffles 2112 disposed at intervals corresponding to the first air inlet 2111, and the second side wall 212 has multiple baffles (not shown) disposed at intervals corresponding to the air outlet 2121. There are openings 2113 between any two adjacent baffles 2112 of the first side wall 211 and the second side wall 212, and these openings 2113 form the first air inlet 2111 and the air outlet 2121. The fence opening 31 of the sildable cover 3 includes multiple vents 312 disposed at intervals, and fence is between the vents 312.

As shown in FIG. 11A, when the sildable cover 3 is in the opened state, the openings 2113 (first air inlet) of the first side wall 211 and the openings (air outlet) of the second side wall 212 are available for air flow. when the sildable cover 3 is in the closed state, the positions of the vents 312 of the sildable cover 3 respectively corresponds to the baffles 2112 of the first side wall 211 and the baffles (not shown) of the second side wall 212. That is, when the sildable cover 3 is in the closed state, the vents 312 of the fence openings 31 of the sildable cover 3 coincides with the baffles 2112 of the first side wall 211 and the baffles (not shown) of the second side wall 212, therefore, the first air inlet 2111 (shown in FIG. 2) and the air outlet 2121 (shown in FIG. 2) are completely covered, thereby preventing dust from entering the inside of the casing 21, but still having a partial heat dissipation function.

Figure 12A:
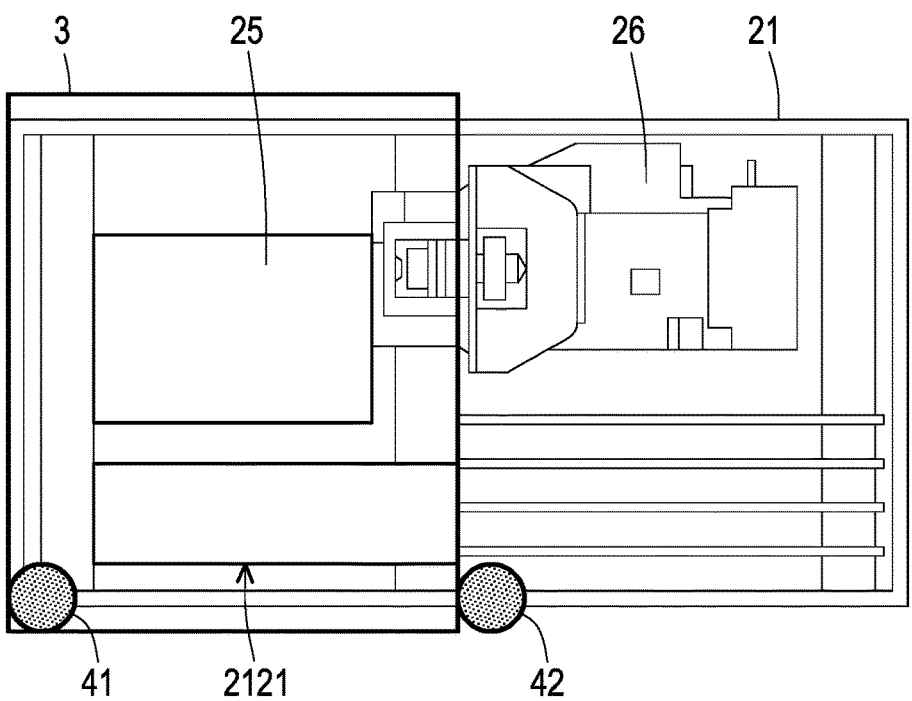
FIG. 12A and FIG.
Figure 12B:
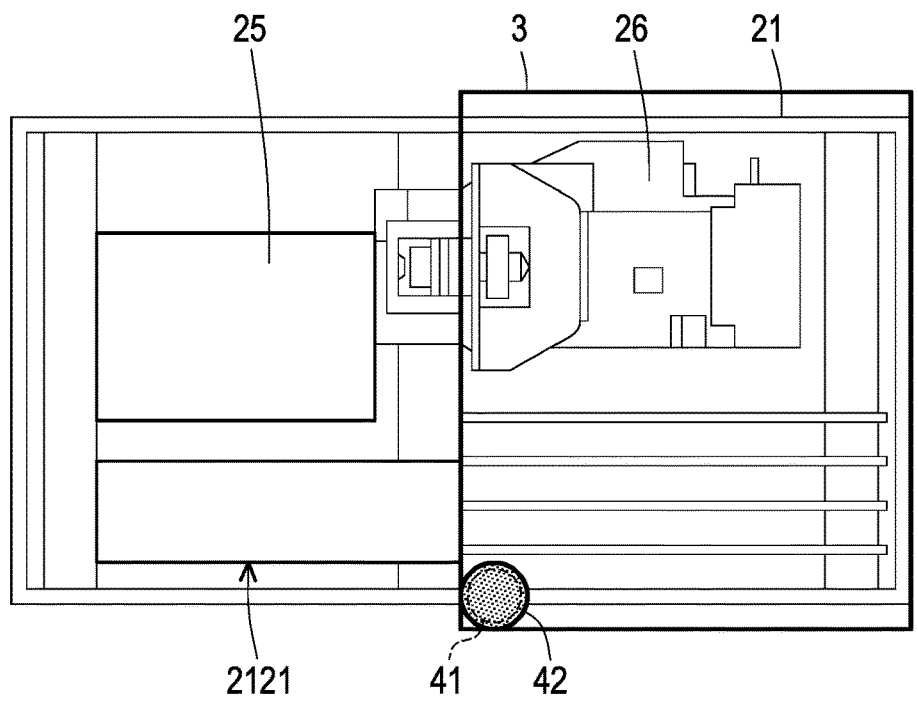
FIG. 12B are schematic views of a projection device further including a sensor.

FIG. 12A and FIG. FIG. 12B are schematic views of a projection device further including a sensor. Referring to FIG. 12A and FIG. 12B at the same time, the projection device 2 also includes a first sensor 41 and a second sensor 42, in which the first sensor 41 is disposed on the casing 21, and the second sensor 42 is disposed on the sildable cover 3.

Figure 13:
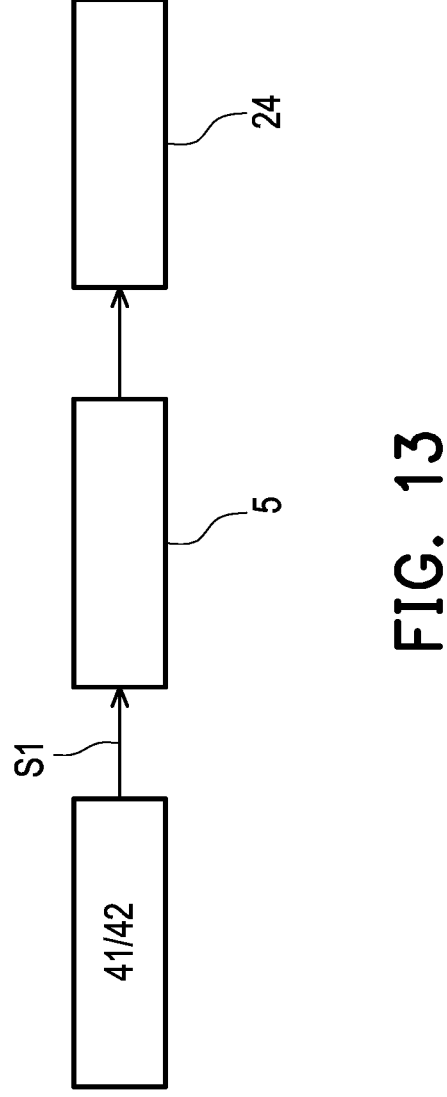
FIG. 13 is a schematic view of the electrical connection relationship of components of the projection device.

FIG. 13 is a schematic view of the electrical connection relationship of components of the projection device. Referring to FIG. 9, FIG. 12A, and FIG. 13, the projection device 2 further includes a control element 5 coupled to the fan 24 for controlling the fan 24. The control element 5 may be, for example, a central processing unit (CPU), a physical processing unit (PPU), a programmable microprocessor, an embedded control chip, digital signal processor (DSP), an application specific integrated circuits (ASIC), or other similar devices that may be used to control and drive the fan 24. The sensing mechanisms of the first sensor 41 and the second sensor 42 are electrically connected to the control element 5, and the control element 5 is electrically connected to the fan 24 and the light source module 22. When the sildable cover 3 moves relative to the casing 21 and is not in the opened state, the first sensor 41 and the second sensor 42 do not sense or contact each other. At this time, he control element 5 of the projection device 2 turns off the fan 24.

Continue referring to FIG. 9, FIG. 12B, and FIG. 13, when the sildable cover 3 moves relative to the casing 21 to be in the opened state, the first sensor 41 and the second sensor 42 sense each other or contact each other to generate a sensing signal S1, which is sent back to the control element 5. At this time, the control element 5 of the projection device 2 activates the fan 24 according to the sensing signal S1, and then further activates the light source module 22 after the fan 24 is activated.

Figure 14A:
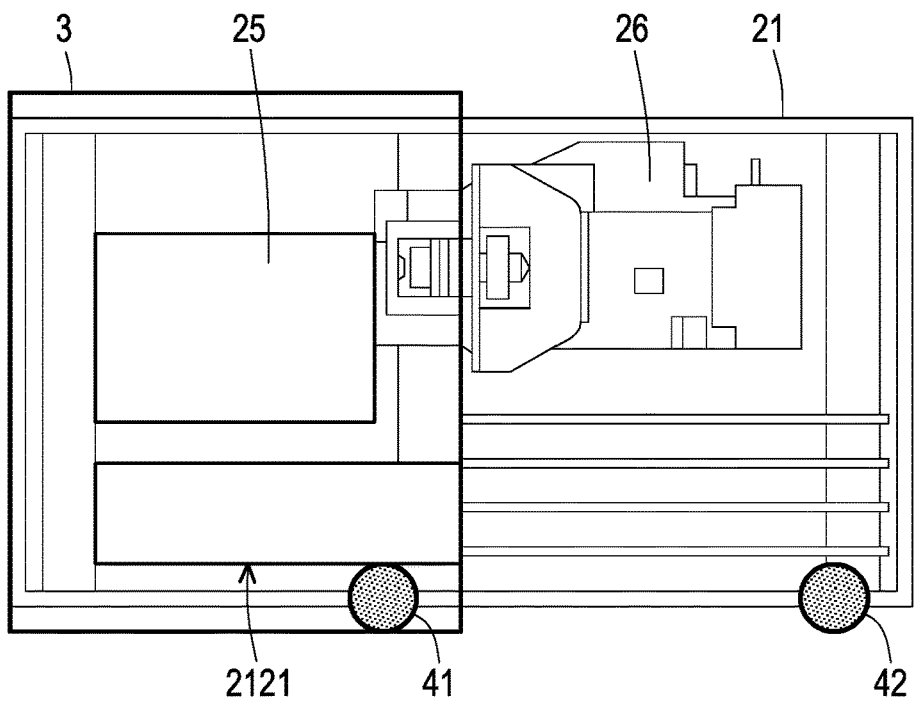
FIG. 14A and FIG. 14B illustrate another disposition method of the sensor.
Figure 14B:
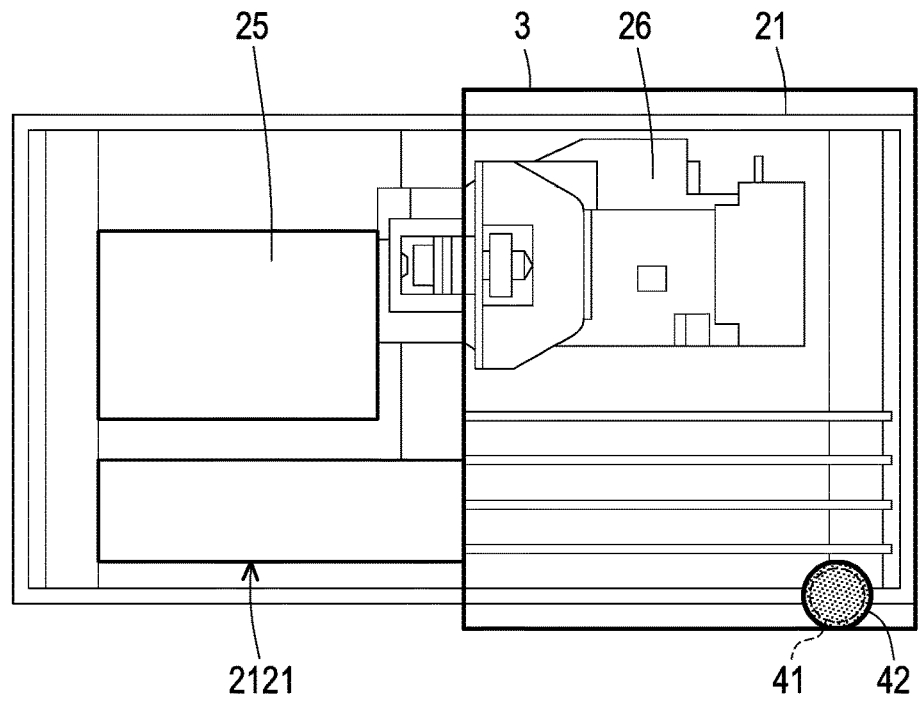

FIG. 14A and FIG. 14B illustrate another disposition method of the sensor. As shown in FIG. 14A and FIG. 14B, the disposition position of the sensors may also be changed according to requirements, and the same technical effect may still be achieved.

The first sensor 41 and the second sensor 42 mentioned above may be electromechanical contact devices, such as magnets; or sensing devices, such as light sensors, which may be selected according to requirements. As shown in FIG. 14A, when the sildable cover 3 moves relative to the casing 21 and is not in the opened state (the drawing is shown in the closed state), the first sensor 41 and the second sensor 42 do not sense or contact each other. As shown in FIG. 14B, when the sildable cover 3 moves relative to the casing 21 to be in the opened state, the first sensor 41 and the second sensor 42 sense each other or contact each other to generate the sensing signal S1 (as shown in FIG. 13).

To sum up, the projection device of the present invention improves the overall heat dissipation effect of the projection device by redesigning the configuration and structure of the elements therein.

In addition, the sildable cover may cover the air inlet, the air outlet, and the opening of the top cover in the closed state, which not only prevents dust from entering the inside of the casing, but also prevents dust from accumulating on the projection lens when the projection device is not in use.

In addition, the dust-proof baffle or the heat dissipation fin set may visually cover the second air inlet from the outside of the projection device, so as to prevent the internal components of the casing from being peeped and affecting the aesthetics of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising: a casing, a light source module, a light source thermal module, a fan, and a projection lens; wherein, the light source module, the light source thermal module, the fan, and the projection lens are disposed in the casing, the casing has a first side wall, a second side wall, and a bottom plate, wherein the first side wall is opposite to the second side wall, the bottom plate is respectively connected to the first side wall and the second side wall, the first side wall is provided with a first air inlet, and the second side wall is provided with an air outlet;

the light source thermal module is connected to the light source module and disposed adjacent to the second side wall, and the light source thermal module is located between the projection lens and the bottom plate;

the fan is disposed between the first side wall and the light source thermal module;

wherein an orthographic projection range of the air outlet onto the first side wall overlaps with an orthographic projection range of the light source thermal module onto the first side wall, and an orthographic projection range of the projection lens onto the first side wall does not overlap with the orthographic projection range of the light source thermal module onto the first side wall.

2. The projection device according to claim 1, further comprising an imaging module, wherein the imaging module is disposed in the casing, and an orthographic projection range of the imaging module onto the first side wall does not overlap with the orthographic projection range of the light source thermal module onto the first side wall.

3. The projection device according to claim 1, wherein the casing comprises a front cover and a rear cover, the front cover is opposite to the rear cover, the front cover and the rear cover are respectively connected to the first side wall and the second side wall, the projection lens is disposed adjacent to the front cover, and the rear cover comprises a second air inlet.

4. The projection device according to claim 1, wherein the fan is disposed between the bottom plate and the projection lens.

5. The projection device according to claim 1, further comprising a heat shield plate, disposed between the light source thermal module and the projection lens.

6. The projection device according to claim 5, wherein an orthographic projection range of the heat shield plate onto the bottom plate completely overlaps with the orthographic projection range of the light source thermal module onto the bottom plate.

7. The projection device according to claim 5, wherein gaps are provided between the heat shield plate and the light source thermal module, and between the heat shield plate and the projection lens, and the gaps are greater than or equal to 1 millimeter (mm).

8. The projection device according to claim 7, wherein thermal conductivity of the heat shield plate is less than or equal to 1 W/mK.

9. The projection device according to claim 1, wherein the casing comprises a top cover, the top cover is connected to the first side wall and the second side wall, the top cover comprises an opening, and the opening exposes a portion of the projection lens.

10. The projection device according to claim 9, further comprising a sildable cover disposed on the casing, wherein the sildable cover is configured to slide relative to the casing to be in an opened state or a closed state, the opening of the top cover is exposed when the sildable cover is in the opened state, and the opening of the top cover is covered when the sildable cover is in the closed state.

11. The projection device according to claim 10, wherein the sildable cover has fence openings respectively corresponding to the first air inlet and the air outlet, and when the sildable cover is in a closed state, positions of the fence openings of the sildable cover correspond to positions of the first air inlet and the air outlet of the casing.

12. The projection device according to claim 11, wherein the first side wall has a plurality of baffles disposed at intervals corresponding to the first air inlet, the second side wall has a plurality of baffles disposed at intervals corresponding to the air outlet, the fence openings of the sildable cover comprise a plurality of vents disposed at intervals, when the sildable cover is in the closed state, positions of the vents of the sildable cover respectively correspond to the baffles of the first side wall and the baffles of the second side wall.

13. The projection device according to claim 10, further comprising a first sensor and a second sensor, wherein the first sensor is disposed on the casing and the second sensor is disposed on the sildable cover, when the sildable cover moves relative to the casing to be in the opened state, the first sensor and the second sensor sense or contact each other to generate a sensing signal, and when the sildable cover moves relative to the casing and is not in the opened state, the first sensor and the second sensor do not sense or contact each other.

14. The projection device according to claim 13, wherein the projection device activates the fan according to the sensing signal, and when the first sensor and the second sensor do not sense or contact each other, the projection device turns off the fan.

15. The projection device according to claim 3, further comprising a dust-proof baffle disposed in the casing and corresponding to the second air inlet.

16. The projection device according to claim 15, wherein the dust-proof baffle comprises a bent portion bent toward the rear cover.

17. The projection device according to claim 3, further comprising a heat dissipation fin set, wherein the heat dissipation fin set is disposed in the casing and adjacent to the rear cover, the heat dissipation fin set is disposed corresponding to the second air inlet and a portion of the heat dissipation fin set facing towards the second air inlet is coated with black paint.

18. The projection device according to claim 1, wherein the orthographic projection range of the light source thermal module onto the first side wall does not overlap with an orthographic projection range of the light source module onto the first side wall.

19. The projection device according to claim 1, wherein the orthographic projection range of the air outlet onto the first side wall overlaps with the first air inlet of the first side wall.

\* \* \* \* \*